United States Patent [19]

Billett et al.

[11] 4,425,089
[45] Jan. 10, 1984

[54] APPARATUS FOR EXTRACTING FROZEN CONFECTIONS

[75] Inventors: Ronald J. Billett, Sunnyvale, Calif.; David N. Anderson; William M. Easter, both of Lakeland, Fla.

[73] Assignee: FMC Corporation, Chicago, Ill.

[21] Appl. No.: 397,619

[22] Filed: Jul. 12, 1982

Related U.S. Application Data

[62] Division of Ser. No. 146,814, May 5, 1980, abandoned.

[51] Int. Cl.³ .......................... B29C 7/00; B29C 1/00
[52] U.S. Cl. ................................ 425/438; 425/126 S
[58] Field of Search .................... 425/126 S, 125, 436, 425/436 RM, 438

[56] References Cited

U.S. PATENT DOCUMENTS 1,960,456  5/1934  Robb .................................... 425/436
2,911,121  11/1959  Glass ................................... 425/117

FOREIGN PATENT DOCUMENTS 636701  2/1962  Canada ............................. 425/126 S Primary Examiner—Willard E. Hoag
Attorney, Agent, or Firm—Louis J. Pizzanelli; Richard B. Megley

[57] ABSTRACT

Apparatus for extracting frozen stick confections from several mold cups of a mold strip of a stick confection freezing apparatus is disclosed. At a pre-extraction station, the sticks of the frozen confections are individually grasped and individually pulled with separate spring forces while the mold cups are heated from below by hot water sprays. Each confection is lifted from the mold cup as soon as the surface layer thereof sufficiently thaws, and before each confection is completely removed from the cup, it is released and dropped back into the cup. At a second extraction station, all of the confections are simultaneously removed and thereafter conveyed to apparatus for wrapping the frozen confections.

12 Claims, 16 Drawing Figures

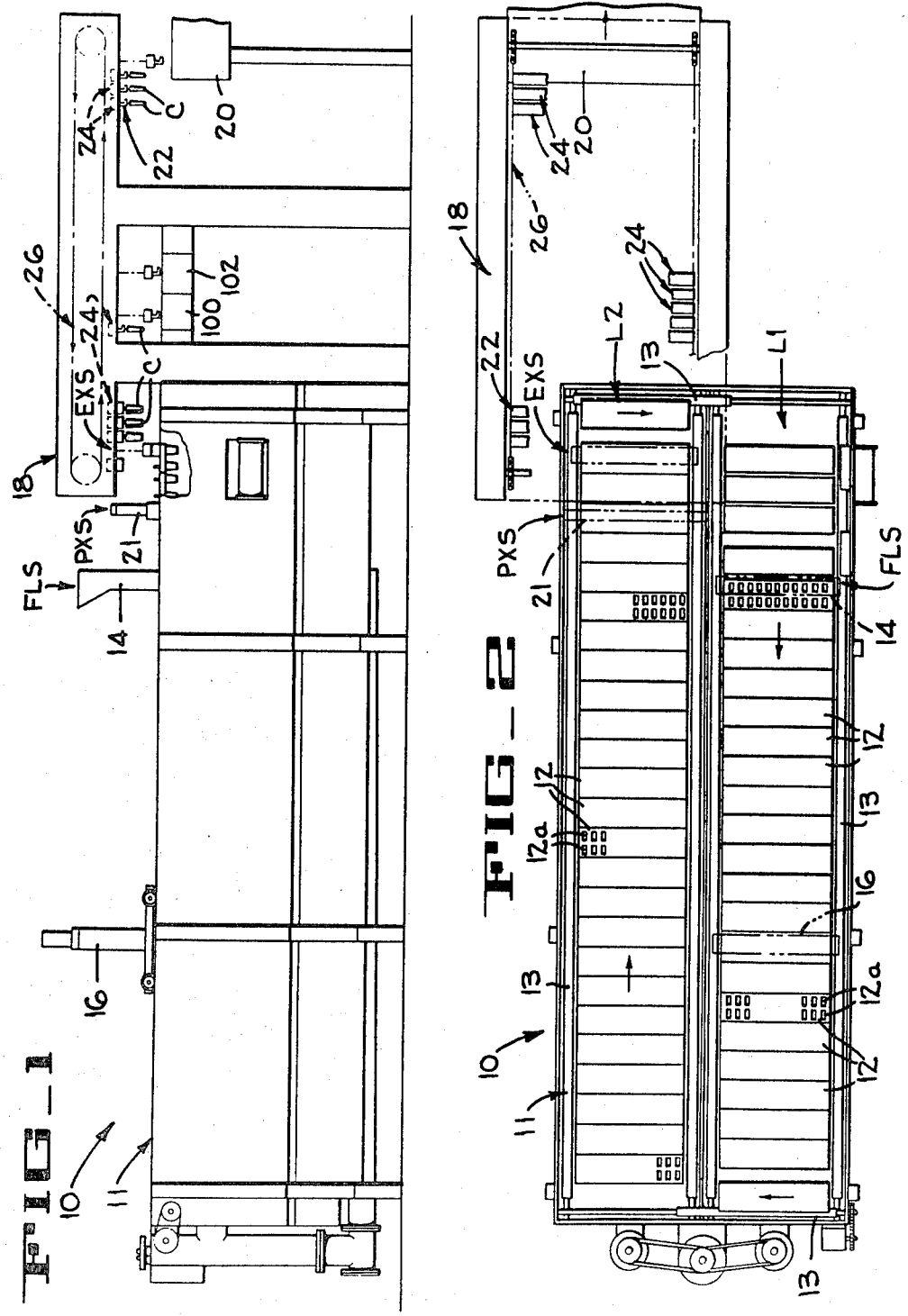

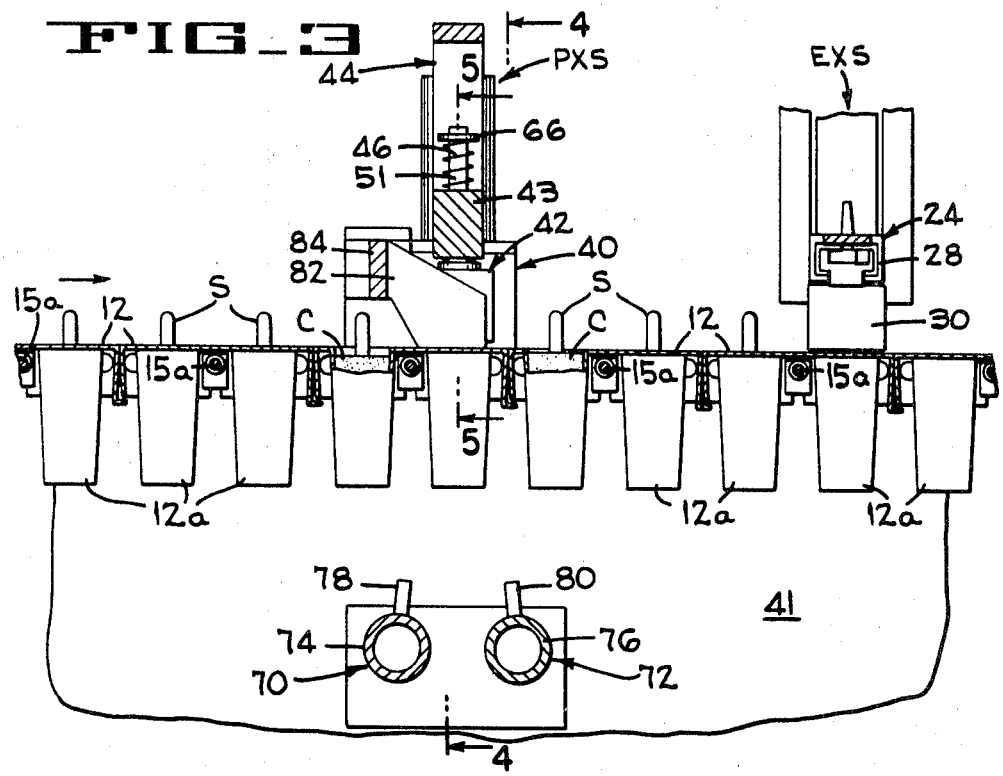
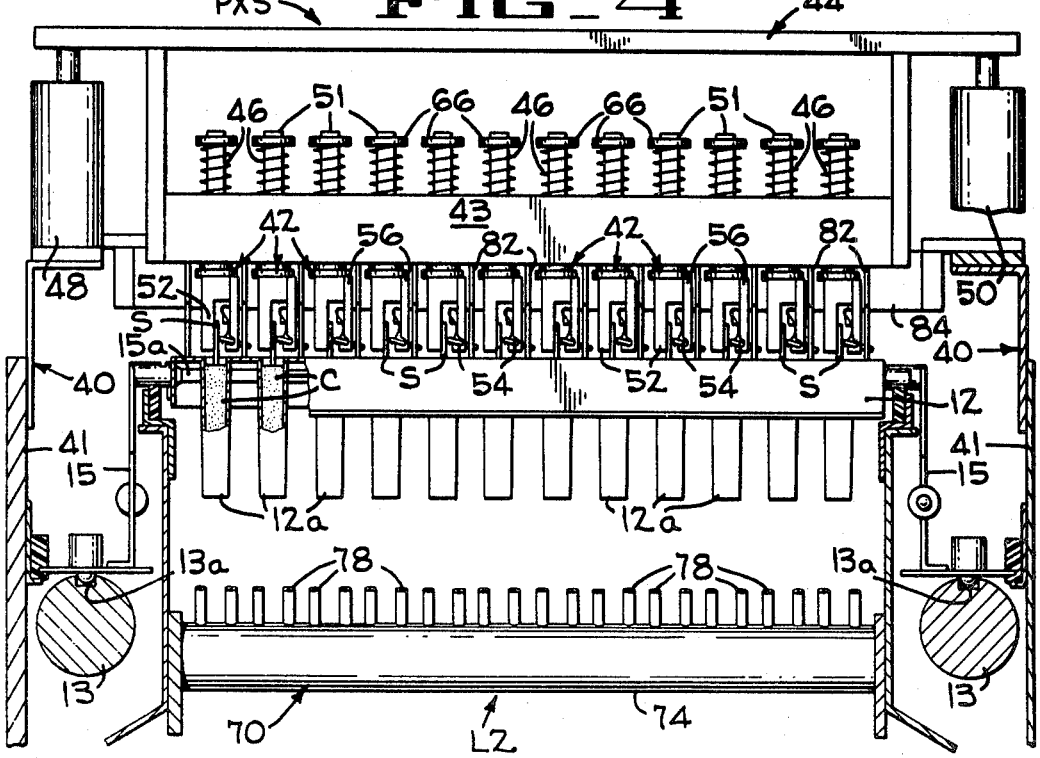

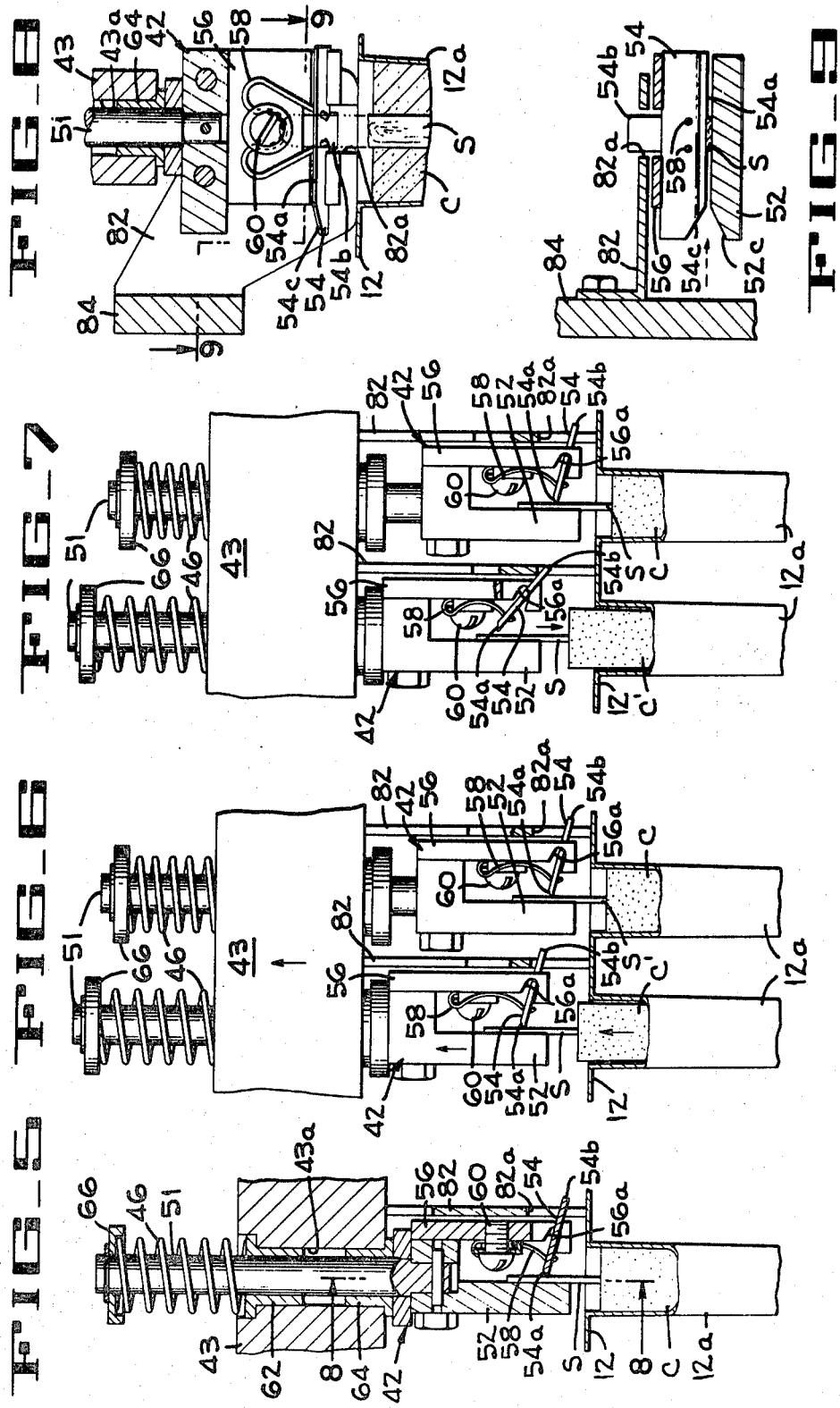

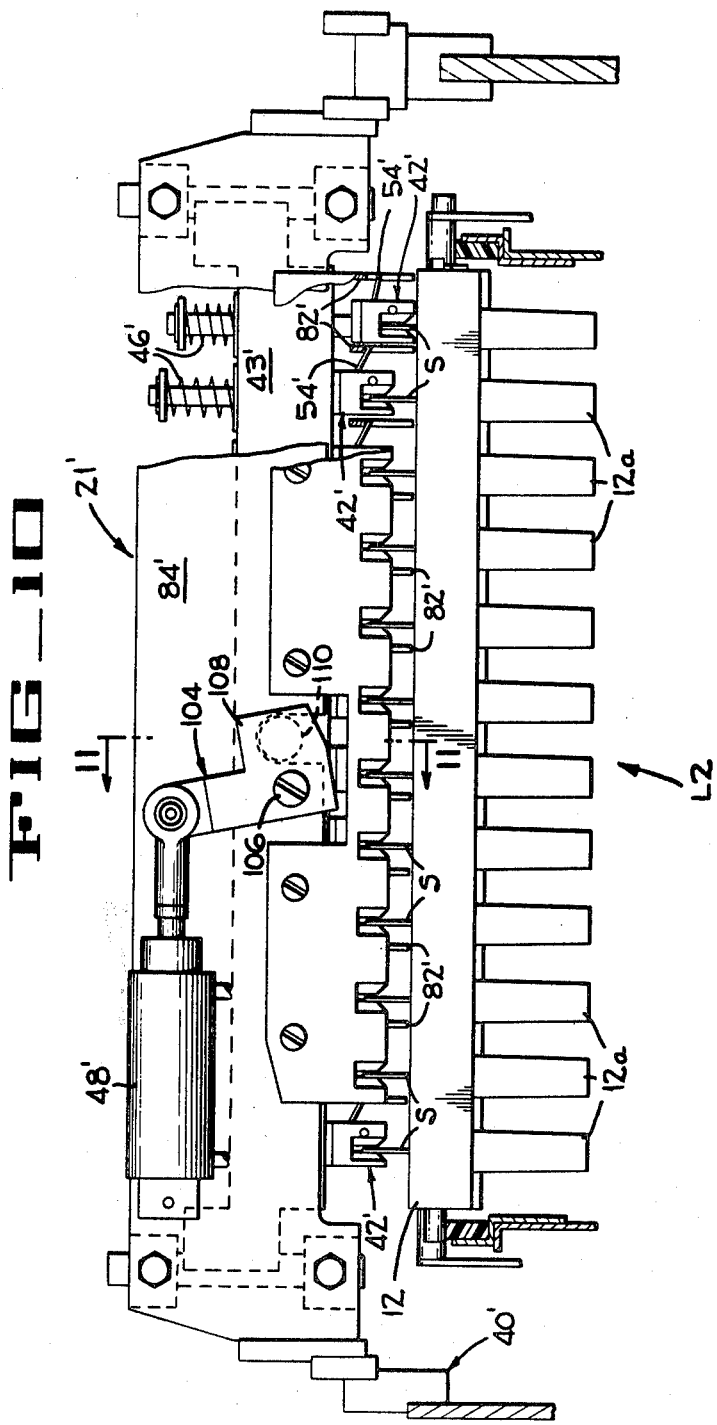

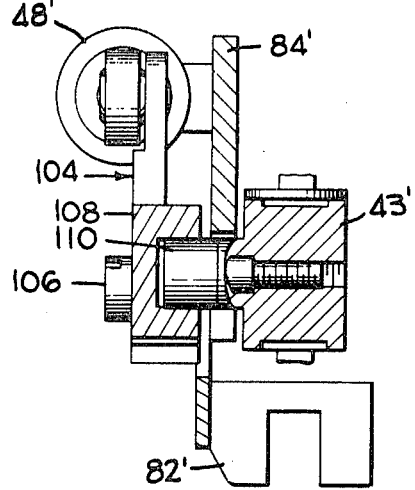
FIG_11
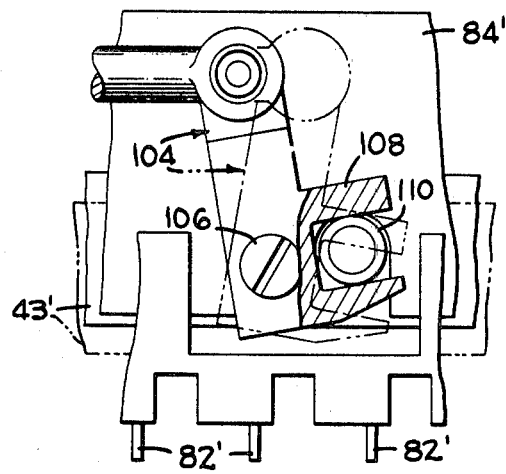
FIG_12
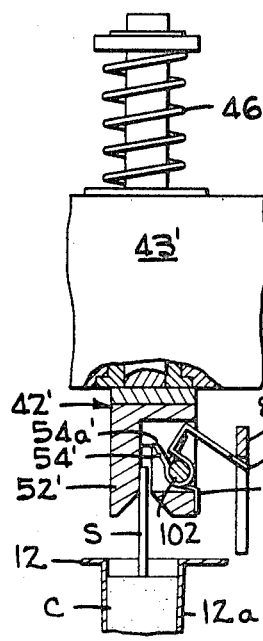
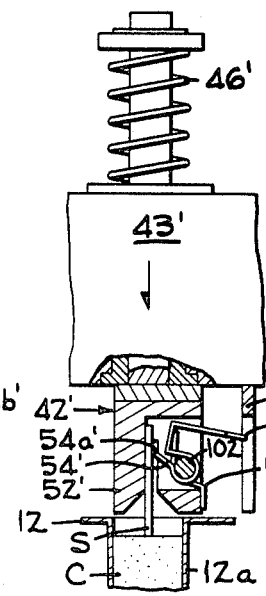
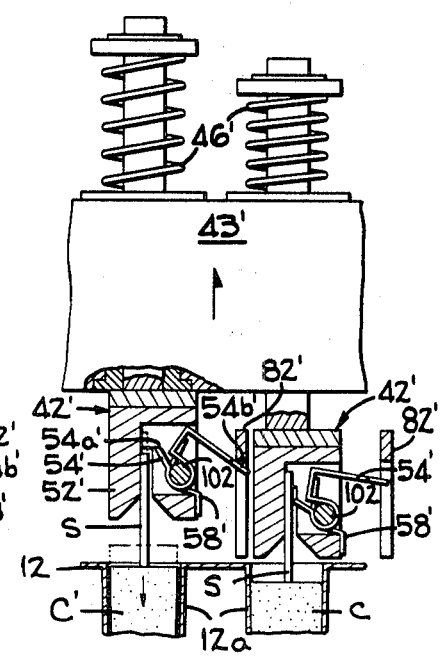
FIG_13   FIG_14   FIG_15
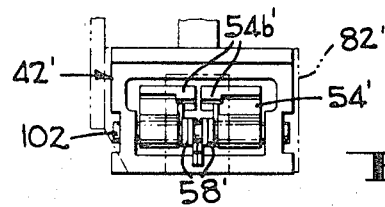
FIG_16

APPARATUS FOR EXTRACTING FROZEN CONFECTIONS

This application is a division, of application Ser. No. 146,814, filed May 5, 1980, now abandoned.

BACKGROUND OF THE INVENTION

1. Field of the Invention

The present invention generally relates to a method of and apparatus for producing frozen confections of the type that includes a block of frozen confection material and a stick projecting from the block, and, more particularly, the present invention relates to a method of and apparatus for extracting frozen stick confections from the mold cups of an apparatus for freezing the confection material.

2. Description of the Prior Art

U.S. Pat. No. 3,031,978 to M. B. Rasmusson describes an apparatus for producing frozen confections which generally includes an apparatus for freezing confection material, a filler for depositing confection material into the mold cups of the freezing apparatus, and an extractor-conveyor for extracting the frozen confections from the mold cups after the confection material has been frozen therein. The freezing apparatus includes a plurality of mold strips, and each strip includes a row of mold cups. The filler is situated at one end of a cold brine tank of the freezing apparatus through which the mold cups are conveyed, and confection material is successively deposited by the filler into the cups of the mold strips. After the confection material has been partially frozen, sticks are inserted by a stick inserter to embed the sticks in the material so that the ends of the sticks project upwardly from the mold strips.

The extractor-conveyor of the aforementioned Rasmusson patent includes a plurality of extractor bar assemblies and an endless chain conveyor for indexing the extractor bar assemblies from an extraction station situated at one end of the freezing apparatus to an ejection station situated over the wrapper. At the extraction station, an extractor bar is lowered to engage the sticks of the confections within a row of mold cups, and simultaneously therewith, a tank having a hot liquid therein is raised to submerge the bottoms of the mold cups in hot water to thereby heat the mold cups to the extent that the frozen confections may be readily separated therefrom.

A sprayer device has also been developed for heating the mold cups to permit the confections to be removed. U.S. Pat. No. 3,695,895 to J. S. Brown discloses a sprayer apparatus wherein hot water is directed in prescribed trajectories against opposite sides of the mold cups at the extraction station to heat the mold cups without requiring that the mold cups be lowered.

A general criteria for the operation of an extractor for frozen stick confections is that while the mold cups must be adequately heated to an extent which permits the confections to be removed, the confections should not be overheated so that an unnecessarily great amount of confection material is left in the mold cups after extraction. Generally, the worst case situation is contemplated in determining the amount of heat to be applied to separate the confections; enough heat is applied to remove the confections that are the most difficult to extract, such as a confection that is formed in a dented or otherwise defective mold cup. Otherwise, it would be possible that the extractor would lose its grip on such a confection tenaciously contained in a defective cup and so fail to remove it from the cup. If a confection is not removed, such confection will of course not be transferred to the wrapper and thus will be lost. Moreover, the missed confection must be removed, otherwise the filler would attempt to deposit more confection material upon the missed product. To prevent this occurrence, operators have normally increased the temperature of the spray or diptank water so that, on the average, the confections are excessively melted.

SUMMARY OF THE INVENTION

The present invention provides an improved method of and apparatus for extracting frozen stick confections from the mold cups of a stick confection freezing apparatus which eliminates concern about excessive melting of the confections upon extraction.

According to the present invention confection material is first deposited in the mold cups of a mold member and then the mold cups are cooled to freeze the confection material therein. Prior to the time that the confection material is completely frozen, sticks are inserted into the confection material within the mold cups so that the sticks project upwardly therefrom. After the confections are completely frozen, the sticks are individually grasped and are individually and separately biased upwardly. Concurrently, the mold cups are heated to thaw the surface layer of the confections in contact therewith. When the surface of each confection has been melted to the extent that it is separable from the mold cup in which it is formed, it is individually and separately pulled upwardly out of contact with its mold cup, while other confections that have not yet sufficiently thawed remain in their respective mold cups.

In the preferred embodiment of the invention, after the confections have been partially removed from the cups, they are dropped back into the mold cups. After a time sufficient to permit all of the confections to be partially removed and dropped back into the cups, the cups are moved to a second extraction station whereat the confections are all grasped and are all simultaneously completely removed from the cups. Thereafter, the confections are conveyed to a further processing apparatus, such as a wrapper. In such preferred embodiment, frost forms on the exterior surface of the confection immediately after it is first removed, and such frost causes the frozen confections to not adhere to the mold cups after they are dropped back into the cups, thereby enabling the confections to be readily removed without further application of heat when they are extracted for purposes of conveyance to the wrapper.

BRIEF DESCRIPTION OF THE DRAWINGS

FIG. 1 is a diagrammatic elevational view of an apparatus for producing frozen stick confections which includes the extraction system of the present invention.

FIG. 2 is a diagrammatic top plan view of the frozen confection producing apparatus which is partially broken away.

FIG. 3 is a fragmentary sectional view of a first embodiment of the extractor apparatus of the present invention.

FIG. 4 is a section taken on line 4—4 of FIG. 3.

FIG. 5 is an enlarged fragmentary section taken on line 5—5 of FIG. 3 of one of the gripper units of the FIG. 3 embodiment of the extractor apparatus.

FIGS. 6 and 7 are fragmentary side elevation views which illustrate the operation of the gripper units of FIG. 5.

FIG. 8 is a section taken on line 8—8 of FIG. 5.

FIG. 9 is a section taken on line 9—9 of FIG. 8.

FIG. 10 is a front elevation of a second embodiment of the extractor apparatus which is partially broken away to illustrate the gripper units thereof.

FIG. 11 is an enlarged section taken on line 11—11 of FIG. 10.

FIG. 12 is an enlarged fragmentary view of the apparatus of FIG. 11 particularly showing the bellcrank drive connection between the pneumatic cylinder and the crosshead bar upon which the gripper units are mounted.

FIGS. 13-15 are fragmentary sectional views showing the operation of the gripper units of the second embodiment of the extractor apparatus.

FIG. 16 is a fragmentary side elevation view of the lower portion of one of the gripper units of the second embodiment of the extractor apparatus, with the configuration of an adjacent stop member being shown in phantom outline.

DESCRIPTION OF THE PREFERRED EMBODIMENTS

Referring to FIGS. 1 and 2, an apparatus 18 for extracting stick confections of the present invention is shown in connection with a system 10 for producing frozen confections that includes a freezing apparatus 11. Such freezing apparatus is described in detail in the copending concurrently filed application of R. J. Billett et al entitled Apparatus For Producing Frozen Confections. The apparatus 11 is also fully disclosed in the copending U.S. patent application of R. J. Billett et al entitled Apparatus For Freezing Confection Material and filed concurrently herewith. Generally, the freezing apparatus includes a plurality of rectangular mold strips 12, each mold strip including two rows of mold cups 12a. The mold strips 12 are moved in abutting relationship in a rectangular path of travel including a filling lane L1 and an extraction lane L2 (see FIG. 2). Confection material is deposited in the mold cups of a row of mold cups by a filler 14 at a filling station FLS that is near the upstream end of the filling lane L1. Under the downstream portion of the filling lane and the upstream portion of the extraction lane, nozzles (not shown) are provided for directing jets of cold brine against the lower surfaces of the mold strips to freeze the confection material within the mold cups. Prior to the time that the confections are frozen, sticks S are inserted into the confections C (FIGS. 3 and 5-7) by a stick inserter 16 (FIG. 2). At the end of lane L1, a mold strip having confection material therein is laterally transferred to the upstream end of lane L2 and is then indexed in closely spaced single file through the extraction lane L2 over further freezer nozzles. The extractor apparatus 18 of the present invention is positioned at the downstream end of extraction lane L2 to remove the completely frozen confections from the mold cups and to convey the confections to a wrapper apparatus 20.

It will be seen in FIGS. 2-4 that the mold cups 12a are formed in the mold strips 12 with the widest dimension of the mold cups extending in the path of travel in lanes L1 and L2 and with the mold cups being relatively closely spaced. That is to say the mold cups 12a have rectangular cross sections which are wider in one dimension than in the other dimension, and the mold cups are transversely oriented in each row thereof. The filler 14 is constructed generally in accordance with the disclosure of U.S. Pat. No. 2,850,051 to M. B. Rasmusson, which patent is incorporated herein by reference. It is noted that the filler spouts (not shown) of the filler are adapted to the relatively reducing spacing between the mold cups 12a. The stick inserter 16 is disclosed in the copending concurrently filed U.S. patent application of B. M. Harper et al that is entitled, Inserting Sticks Into Confections. The subject matter of this patent application is also incorporated herein by reference, and reference may be made thereto for details of the construction of the stick inserter. It is generally noted that the inserter is adapted to insert the sticks S parallel to the mold cups and within the centers of each body of confection material within the mold cups. It will be understood that the stick inserter will be positioned either in the filling lane L1 or in the extraction lane L2 at a position whereat the confection material has been sufficiently partially frozen and that the position of the stick insertion apparatus will thus depend on the freezing rate of the confection material from which the frozen confections are formed.

Extractor apparatus 18 generally includes a pre-extractor 21 located at a pre-extraction station PXS and an extractor-conveyor 22 situated at an extraction station EXS that is downstream from the pre-extractor. The extractor-conveyor per se is the subject of the concurrently filed copending patent application of Stephen D. Cross et al that is entitled, Stick Confection Extraction Apparatus. Reference is directed to such application for details of the construction of the extractor-conveyor, and the disclosure of such copending application is incorporated herein by reference.

As depicted in FIGS. 1 and 2 the extractor-conveyor 22 generally includes a number of extractor bar assemblies 24 which are arranged upon an endless chain conveyor 26 in closely spaced relationship and which are indexed in synchronous relation with the indexing movement of the mold strips 12 of the freezing apparatus 11. Each extractor bar assembly includes a channel 28 (FIG. 3) in which a plurality of gripper units 30 are slidably and rotatably mounted. An extractor bar assembly is lowered when a row of cups 12a from which confections are to be removed is positioned therebelow at the extraction station EXS to cause the gripper units 30 to engage the individual sticks so that when the extractor bar assembly is subsequently raised, all of the confections in one row will be simultaneously removed. As in the prior art extractor assemblies, the gripper units 30 are non-resiliently mounted to the channel 28 so that all of the confections are concurrently removed from the mold cups. However, as shall now be described, by the time the frozen confections reach the extraction station EXS, the pre-extractor 21 has already once removed the frozen confections from the mold cups and has dropped the removed confections back into their original mold cups so that the confections may be readily removed by the extractor-conveyor 22 without heating the mold cups at the extraction station. While the extractor-conveyor disclosed in the abovementioned copending patent application of Cross et al is preferred, it is within the scope of the present invention that virtually any conventional extractor-conveyor may be used which includes means for simultaneously gripping a row of confection sticks to lift the confections from the molds.

In a first embodiment of the pre-extractor 21 as shown in FIGS. 3–9, the pre-extractor includes a frame 40 that is rigidly mounted to the side walls 41 (FIG. 4) of the freezing apparatus 11 at the pre-extraction station PXS (FIG. 2). Such pre-extraction station PXS will be seen to be located immediately upstream of the upstream end of the extractor-conveyor 22 with three rows of mold cups 12a being positioned between the extraction station EXS and the pre-extraction station PXS. A plurality of gripper units 42 equal in number to the number of mold cups in the rows of cups are resiliently mounted upon a horizontal bar 43 of a crosshead assembly 44 which extends directly over the rows of mold cups at the pre-extraction station. Each gripper unit is biased upwardly on the horizontal bar 43 by a separate coil spring 46, and the ends of the crosshead 44 are mounted to the pistons of an aligned pair of pneumatic cyliners 48 and 50. The cylinders 48 and 50 extend vertically upwardly from the frame 40 at opposite sides of the pre-extractor. In general, cylinders 48 and 50 are actuated to raise the crosshead 44 which raises horizontal bar 43 comprising the coil springs to individually and separately bias the gripper units upwardly to extract the stick confections from the mold cups immediately as soon as the bond of any particular confection is weakened as will be made evident hereinafter.

Referring next to FIG. 5, it will be seen that each gripper unit 42 engages the stick S of a frozen confection within the associated mold cup 12a and slides forwardly into gripping engagement with a holder blade 54 of the gripper unit as the row of confections is indexed into the pre-extraction station PXS. The holder blade 54 includes a knife edge 54a engaging one side of the stick, and the other side of the stick being abutted against a flat vertical surface of a depending plate 52. The blade 54 includes a tab portion 54b extending through an aperture in a plate 56 mounted on the gripper unit 42 in opposed relationship to the plate 52. The plates 52 and 56 are secured in opposed relationship upon the lower end of a rod 51. The blade 54 is biased downwardly into engagement with the stick by a torsion spring 58 connected by screw 60 to plate 56. It will be seen that the blade is supported in a notch 56a formed in the lower end of the plate 56. To enable the sticks to readily slide into engagement with the blade 54 and plate 52, the leading edges 54c and 52c (FIG. 9) of the blade 54 and plate 52 are cut away on converging tapers.

Each rod 51 of a gripper unit extends through a bore 43a formed vertically within the crosshead bar 43 in alignment with the mold cups 12a of a mold strip 12. Bushings 62 and 64 are received in such aperture, and the coil spring 46 for upwardly biasing the gripper unit is received about the upper end of the rod between the upper bushing 62 and a retainer ring or clip 66 at the top of the rod. When the crosshead bar 43 is elevated by the cylinders 48 and 50, the springs 46 of the gripper units will be compressed as shown in FIG. 6. At such point, the knife edges 54a will dig into the sticks S to tightly engage to pull upwardly on the sticks.

It will be understood from the aforegoing description of the prior art that prior art frozen confection producing apparatus generally includes some means for heating the mold cups to thaw the surface layer of the frozen confections in contact therewith so that the confections may be separated from the mold cups. In the present pre-extractor 21, a pair of longitudinally spaced, transversely extending, horizontal spray manifolds 70 and 72 (FIGS. 3 and 4) are provided at the pre-extraction station PXS to direct jets of hot water against the mold cups 12a. The manifolds 70 and 72 comprise tubes 74 and 76 to which separate nozzle elements 78 and 80 are attached. Hot water under pressure is continuously pumped into the tubes 74, 76 to direct streams of hot water upwardly through the nozzles and against the upper ends of the mold cups so that the water flows downwardly over the outer surfaces of the mold cups. The spray manifolds and nozzle elements are essentially the same as shown in the aforementioned U.S. Pat. No. 3,695,895 to J. S. Brown, which patent is owned by the assignee of the present invention and is incorporated herein by reference. Hot water is pumped to the spray manifolds continuously and is maintained at a temperature which is sufficiently hot to rapidly heat the mold cups.

At the instant that the surface layer of a confection has been sufficiently thawed to permit the frozen confection therein to be released from its adherance to the mold cup walls, the confection is removed from the surrounding mold cup by the associated gripper unit 42. FIGS. 5–7 illustrate the removal of the confections. In FIG. 5, the confection C has just been moved into position centered within the associated gripper head 42 between the blade 54 and plate 52. In FIG. 6, the crosshead bar 43 has been elevated by the cylinders 48 and 50. In this view, the surface layer of the right-hand confection is still so unthawed that the confection is retained within the associated mold cup and will only be removed after the surface layer thereof is further melted by the hot water from the spray manifolds 70 and 72. On the other hand, the surface layer of the adjacent confection C' has already been sufficiently thawed to permit the associated spring 46 to start to lift the gripper unit 42 to partially remove the confection C'.

FIG. 7 illustrates the subsequent release of the left-hand confection C' so that it may drop back into the associated mold cup 12a. It will be seen that the outer tab portion 54b of the gripper blade is engaged by a stop plate 82 that is stationarily mounted to the support frame 40 of the pre-extractor. This occurs when the crosshead bar 43 reaches its upper limit of travel. As shown in FIGS. 4, 8 and 9, the support frame 40 includes a vertical cross plate 84 extending parallel to and at the upstream side of the crosshead bar 43. The stop plates 82 are arranged in vertical planes adjacent the gripper units and are bolted to the cross plate 84 to project perpendicularly therefrom. The stop plates have slots 82a formed therein through which the tab portion 54b of the associated blade 54 projects. As shown in FIG. 8, the lower ends of the stop plates 82 are parallel to and positioned closely above the mold strip 12 at the pre-extraction station to engage the mold strip and hold it down when the gripper units 42 are elevated to extract the confections. It is further noted (FIG. 4) that each mold strip 12 is securely engaged to a cradle 15 of the conveyor of the freezing apparatus 11 including a shaft 15a extending centrally of the mold strip.

The air flow to the ports at the ends of the double-acting pneumatic cylinders 48 and 50 of the pre-extractor 21 are controlled by separate solenoid valves (not shown). Such valves are, in turn, connected to a non-illustrated control circuit that includes an optical shaft encoder (not shown) which is connected to the drive mechanism of the conveyor of the freezing apparatus 11. As shown in FIG. 4, the drive mechanism for the freezing apparatus includes conveyor screws 13 that have continuous grooves 13a formed therein, and the mold strips 12 are each pivotally attached to a cradle 15 that includes pins received in the conveyor screw grooves as shown. The screws are driven continuously by a chain drive (not shown) to propel the mold strips along the lanes L1 and L2, and the screw grooves 13a have dwell sections formed therein that are aligned with the pre-extraction station PXS and the extraction station EXS to cause each row of mold cups 12a to dwell below the pre-extractor 21 (and thus above the spray manifolds 70 and 72) and also below the extractor-conveyor 22.

The optical shaft encoder includes a shaft connected to the chain drive for the conveyor screws 13, several discs mounted on the shaft, and photoelectric switches associated with the discs. The encoder is adapted to actuate the solenoid valves in the air lines to the cylinders 48 and 50 to reverse the air flow therein to elevate the crosshead 44 after each row of mold cups 12a has been brought to rest below the gripper units 42 at the pre-extraction station PXS. After a pre-extracted period of time, the cylinders 48, 50 are automatically retracted to lower the gripper units 42 to their original positions while the mold strip conveyor indexes the next row of mold cups into position below the gripper units 42.

As soon as a confection C is extracted from its particular mold cup 12a at the pre-extraction station PXS, a layer of frost forms on the confection. Such frost forms a sufficiently thick layer on the confection so that when the confection is dropped back into the associated mold cup, it will ride higher in the mold cup (FIG. 3) and will not readhere to the walls of the mold cup. The loosened confections may thus be readily removed at the extraction station PXS by the extractor-conveyor 22 without the need for reheating the mold cups.

After the confections have been removed by the extractor-conveyor 22, they are conveyed in indexed fashion by the endless chain conveyor 26 thereof. As disclosed in the aforementioned copending application of S. D. Cross et al, the extractor bar assemblies 24 are adapted to rotate the confections engaged therein after they have been picked up from the mold cups (see FIG. 1) so that they ultimately extend transversely of their direction of travel; this serves to separate the confections by wider intervals along the conveyor 26. Such rotation and resultant separation occurs after the confections have been removed from the mold cups 12a and prior to the time that they are brought into position above a chocolate dip tank 100 (FIG. 1). The confections are then dipped into the dip tank and then returned to the path of travel of the conveyor 26. Thereafter, the confections may be further dipped into a dry coat device 102 for applying nuts or the like to the surfaces thereof. Thereafter, the coated confections are conveyed to a wrapper apparatus 20, and finally the confections are dropped into the lanes or chutes of such wrapper apparatus for final wrapping wherein they are ready for packaging and shipment to the marketplace.

A second embodiment of the pre-extractor apparatus will now be described in connection with FIGS. 10-16. In the drawings it will be seen that like parts of the second embodiment of the pre-extractor apparatus to the parts of the first embodiment are given like part numbers with prime notations. The second embodiment includes a pre-extractor 21' which also includes a frame 40' mounted to the side walls of the freezing apparatus 11. A single pneumatic cylinder 48' is provided for reciprocating a crosshead bar 43' to elevate and lower the gripper units 42'. As shown in FIGS. 10, 11 and 12, the piston of the cylinder 48' is connected to an upwardly extending arm of a bellcrank 104, and the bellcrank is pivotally mounted upon a screw 106 (FIG. 12) that is connected to a vertical cross plate 84' of the frame 40' (FIG. 11). The bellcrank has a slotted arm 108 that engages a pin 110 extending from the crosshead bar 43' through a slot in the plate 84'. The lowered positions of the bellcrank and crosshead bar are shown in phantom outline in FIG. 12 while the raised positions are shown in full lines.

As in the aforedescribed first embodiment, a plurality of gripper units 42' are mounted in a uniformly spaced series upon the crosshead bar 43' of the second embodiment of the invention. The gripper units include blades 54' which, when the crosshead bar 43' is in its initial raised position, are held open by fixed stop plates 82' that extend perpendicularly from the cross plate 84' (FIG. 11). Each blade 54' is rotatably mounted on a pin 102 and is rotatably biased by a torsion spring 58' (FIGS. 14 and 16) so that the knife edge 54a thereof engages the sticks S of a confection C in cooperation with an opposing depending plate 52' of the gripper unit. The knife edge 54a of the blades are initially spaced from the opposing plates 52' (FIG. 13) and are initially elevated above the sticks due to the engagement of the stop plates 82' with the tab portions 54b' of the blades so that the sticks may be brought into a centered position under the gripper units without any resistance being afforded by the blades. When the row of mold cups 12a has been stopped below the gripper units, the cylinder 48' is actuated to lower the gripper units into the stick gripping positions shown in FIG. 14. It will be seen that the lowering of the gripper units releases the tab portions 54b' from the stop plates 82' to thereby permit the torsion springs 58' to pivot the blades into engagement with the confection sticks.

When the cylinder 48' is thereafter retracted, the crosshead bar 43' will be elevated (as depicted in FIG. 15) to cause coil springs 46' to resiliently and individually urge the gripper units 42' upwardly. As soon as the outer surface of a confection has been thawed so that it can be released from its mold cup the confection is elevated from the associated mold cup as the spring 46' expands (as is shown with respect to confection C' in FIG. 15). After the confection has been thus elevated (to the limited extent of about ½ inch as shown in phantom outline in FIG. 15), the associated stop plate 82' will engage the tab portion 54b' end of the associated blade to pivot the blade away from the stick and thereby release the confection permitting it to drop back into the mold cup. Again, as previously described, the extracted confections will not readhere to the mold cup walls so that they may be readily removed subsequently by the extractor-conveyor 22 without further heating of the mold cups at the extraction station.

Having described two preferred embodiments of the apparatus, the method of the present invention, which is incorporated in the operation of such apparatus, will now be described. A plurality of mold strips 12 having mold cups 12a depending therefrom in rows are moved through a rectangular path of travel including parallel lanes L1 and L2. At a filling station FLS (FIG. 2), confection material is deposited into a row of mold cups as the row of mold cups dwells at such filling station. As the mold strip is thereafter conveyed through lanes L1 and L2, cold brine is sprayed upwardly against the undersides of the molds to freeze the confection material in the mold cups to form frozen confections; this freezing operation is described in detail in the aforementioned copending patent applications of R. J. Billett et al. Prior to the time that the blocks of confection material in the mold cups are completely frozen, sticks S are inserted into the confection material so that they project upwardly from the mold strips.

After being completely frozen within the extraction lane L2, each row of frozen confections C is caused to dwell at the pre-extraction station PXS. At such station, hot water is sprayed from the nozzles 78 and 80 against the undersides of the mold cups 12a to heat the mold cups to thaw the surface layer of the confections in contact with the mold cups. Shortly after the frozen confections are brought to the pre-extraction station PXS, the sticks of the confection are individually and separately biased upwardly by separate spring forces which cause each confection to be pulled from its associated mold cup as soon as the surface layer thereof has sufficiently thawed. The confections are lifted from their mold cups to the extent that they are out of contact with the mold cup. The confections are then dropped back into the mold cups as soon as they have been so partially removed therefrom. Sufficient hot water may be sprayed upon the mold cups at the pre-extraction station so that all of the confections will be released from the mold cups before the row of mold cups is again indexed forwardly, and it will be recognized that this excess spraying will not cause undue melting of the confections which have already been released.

The mold strip 12 having the loosened row of confections therein is then indexed forwardly so that the confections in the other row of cups of the mold strip (or in the next mold strip) may be removed. Thereafter, the mold strip is indexed in step-wise fashion from the pre-extraction station PXS to the extraction station EXS whereat the leading row of loosened confections is caused to dwell and the confections are grasped and pulled upwardly to extract all the confections completely from the mold cups in one gripping and lifting movement. Finally, the confections are conveyed from the extraction station to a drop area where the confections are released into the wrapper apparatus 20 for final packaging.

Although the best modes contemplated for carrying out the present invention have been herein shown and described, it will be apparent that modification and variation may be made without departing from what is regarded to be the subject matter of the invention.

What is claimed is:

1. An apparatus for removing frozen confections from the mold cups of a mold member in which the frozen confections are formed, said frozen confections each including a stick projecting upwardly therefrom, said apparatus comprising a plurality of gripper units, each gripper unit including means for releasably engaging a stick of a frozen confection within a mold cup; a cross member extending above said mold member at an extraction area, said gripper units being mounted to said cross member in alignment with the sticks of the confections; a separate spring interposed between each gripper unit and the cross member to individually and separately bias the gripper units upwardly relative to the mold member; means, supporting said cross member at said extraction area, for causing said gripper units to releasably engage said sticks; means for forcing said cross member upwardly to a selected height above the mold member after said sticks have been engaged by the respective gripper units to cause the springs to individually bias the gripper units upwardly; said height being insufficient to effect complete removal of the confection from the mold, and means at said extraction area for heating the exterior surfaces of the mold cups to melt the surface layers of the frozen confections within the mold cups, said separate springs acting on said gripper units to raise each confection from the associated mold cup as soon as the surface layer thereof has been sufficiently melted.

2. An apparatus for extracting frozen stick confections from an apparatus for freezing the frozen stick confections, said freezing apparatus comprising means for conveying a row of mold cups along a path of travel, means for depositing confection material into the mold cups at one end of said path of travel, means for freezing the confection material within the mold cups as they are conveyed along said path of travel, and means for inserting sticks into the confection material so that the sticks project upwardly from the mold cups; said extracting apparatus comprising means for pre-extracting the frozen confections from the mold cups, said pre-extracting means including a plurality of gripper units for individually and releasably grasping the sticks of the frozen confections in the row of mold cups, means in the vicinity of said gripper units for heating the mold cups to thaw the surface layers of the frozen confections in contact with the mold cups, means for individually and separately upwardly biasing the gripper units to thereby pull the frozen confections from the respective mold cups as soon as each confection has been sufficiently thawed to enable it to be lifted, and means operable on said gripper units for releasing the confections after they have been partially elevated from the mold cups to permit the confections to drop back into the mold cups; and means downstream of said pre-extracting means for grasping the sticks of the frozen confections in the row of mold cups and elevating said confections to completely remove them from the mold cups.

3. An apparatus for conditioning the surface of frozen edible material contained in a mold so that its complete withdrawal from the mold is facilitated, said apparatus comprising means for heating the mold sufficiently to release the bond between the mold and the material, means operative on release of the bond for diassociating the block of frozen material from the mold while retaining a portion of the material within the confines of the mold, such disassociation exposing surfaces of the frozen material to the ambient atmosphere to cause the development of frost on the surfaces of the frozen material, and means for returning the frost laden material to the mold, whereby the frost laden material can be easily and completely withdrawn from the mold for further processing being free from of a bond between the material and the surfaces of the mold.

4. An improved apparatus for extracting frozen confections from a plurality of mold cups depending from a mold member, each frozen confection including a block of confection material contained within the respective mold cup and a stick projecting upwardly from the block of confection material, said extracting apparatus including a plurality of gripper units for releasably engaging the sticks of said confections, a cross member for supporting the said gripper units at positions for engaging the sticks of the confections in said mold cups, means for initially supporting said cross member at a position so that said gripper units releasably engage said sticks, means for elevating said cross member to cause the gripper units to pull the sticks upwardly, and means for heating the mold cups to enable the frozen confections to be extracted from the mold cups, wherein the improvement comprises a plurality of springs, each spring being operatively interposed between one of said gripper units and said cross member for individually upwardly biasing the associated gripper unit upwardly, whereby as said cross member is elevated each spring will urge the respective gripper unit upwardly with a separate spring force to thereby extract the confection from the associated mold cup as soon as the surface layer thereof is melted to the extent that it may be removed from the surrounding mold cup, said extraction being of an insufficient height to effect complete removal of the confection from the mold.

5. The improved apparatus for extracting frozen confections according to claim 4 wherein said extracting apparatus further includes means operatively associated with each gripper unit for releasing the confection from the gripper unit after the confection has been partially removed from the associated mold cup to thereby permit the confection to drop back into the mold cup, and means spaced from said means for heating the mold cups for grasping the sticks of the confections dropped back into the cups and fully lifting the confections from the mold cups.

6. An apparatus for facilitating the removal of frozen edible material solidified in molds wherein a stick firmly retained by the frozen material projects from the mouth of the mold, said apparatus comprising means moveable toward and away from the mold for forceably gripping the stick and concurrently imparting a force acting to withdraw the frozen material from the mold, means for heating the exterior surface of the mold to effect diminishment of the bond occasioned by freezing the edible material in the mold, said heating means on effecting diminishment of the bond renders the withdrawing force effective to partially withdraw the edible material from the mold, said material on being partially withdrawn develops a coating of frost by condensing moisture of the ambient atmosphere on its surface, and releasing means, operative when said gripping means is moved away from the mold, for releasing the stick, said releasing means allowing the frost coated molded material to reenter the mold when released.

7. The apparatus according to claim 6 wherein said releasing means comprises an abutment surface in the path of a spring biased blade cooperating with a plate for gripping the stick, said abutment causing pivotal movement of the blade and release of the stick on raising said gripping means, whereupon the frozen material reenters the mold.

8. The apparatus according to claim 6 wherein movement of said gripping means toward and away from the mold occurs by providing a crosshead overlying the mold, and linear actuators operable to concurrently extend and retract to effect, respectively, lowering and raising of said crosshead.

9. The apparatus according to claim 6 wherein said gripping means comprises a pin rotatably mounting a blade and a spring, said spring operative to bias said blade in contact with a stick, and a stationary abutment contactable by an extension of said blade for causing rotation of said blade toward and away from the position occupied by a stick.

10. The apparatus according to claim 6 wherein said gripping means is moved toward and away from the mold by an actuator connected to a crosshead carrying said gripping means by a bellcrank.

11. The apparatus according to claim 6 wherein said gripping means comprises a spring biased pivotable blade engageable with the stick, a plate confronting the edge of said blade and providing a support surface for a stick closely adjacent thereto, means for moving said gripping means toward the mold, said movement causing pivotal movement of the blade to trap the stick between said support plate and the edge of said blade, and means, rendered operative on movement of said gripping means toward the mold for urging said gripping means away from the mold.

12. The apparatus according to claim 11 wherein said urging means comprises a resiliently biased member carrying said gripping means and operative upon weakening of the bond between the material and the mold to partially extract the frozen material from the mold.

* * * * *